Figure 15:
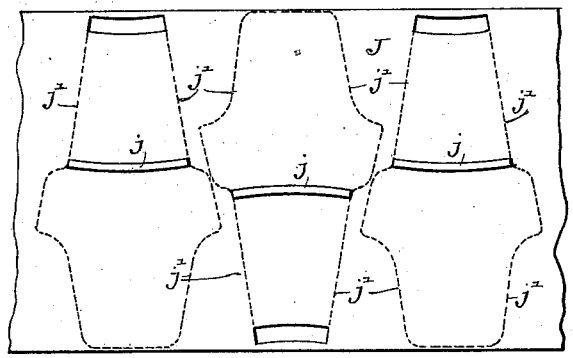

(No Model.) 4 Sheets—Sheet 1.
S. B. PARSONS.
MANUFACTURE OF WAGON SKEINS.
No. 379,026. Patented Mar. 6, 1888.
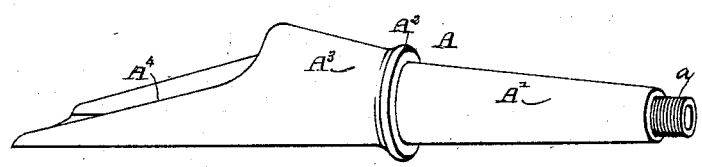
Fig. 1.
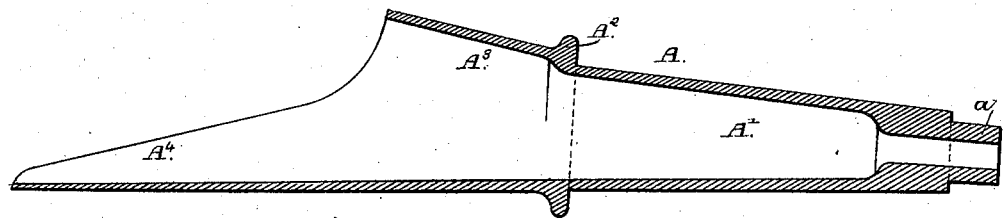
Fig. 2.
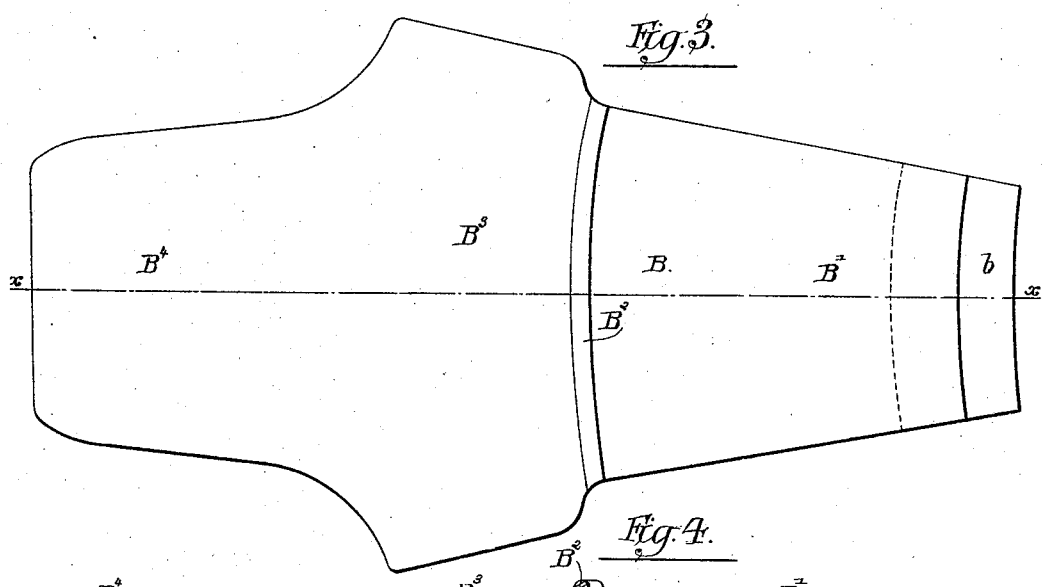
Fig. 3.
Fig. 4.
Witnesses:—
Louis M. F. Whitehead.
Wm. L. Henning.
Inventor:
Seneca B. Parsons.
by— Dayton & Poole
Attorneys:—

(No Model.) 4 Sheets—Sheet 2.
S. B. PARSONS.
MANUFACTURE OF WAGON SKEINS.
No. 379,026. Patented Mar. 6, 1888.
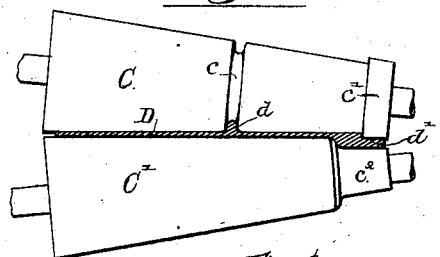
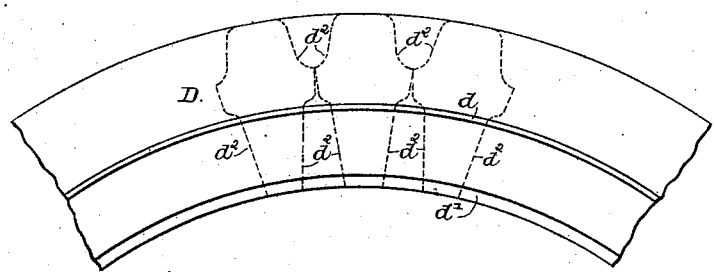
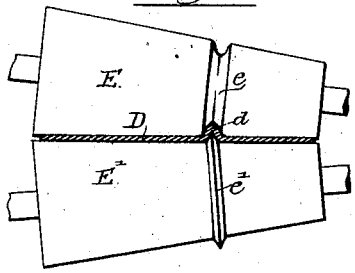
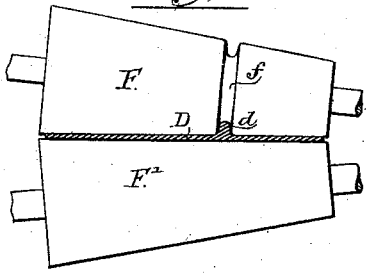
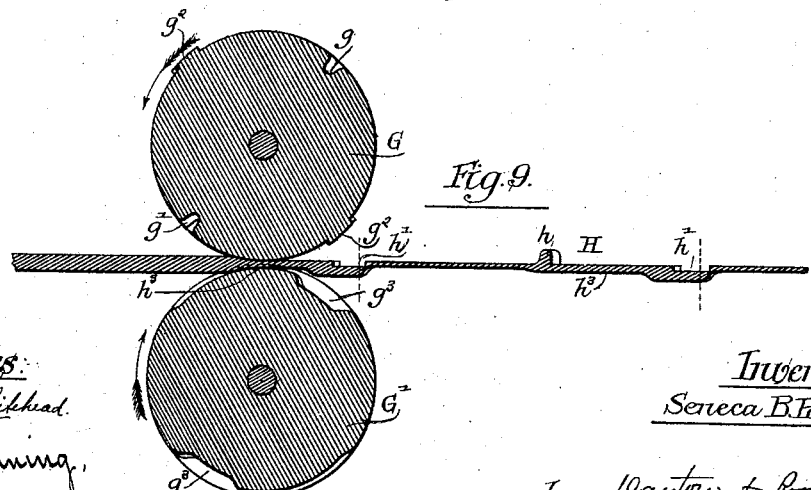
Witnesses:
Louis M. F. Whitehead.
Wm. F. Henning.
Inventor:—
Seneca B. Parsons
by Dayton & Poole
Attorneys:—

(No Model.) 4 Sheets—Sheet 3.
S. B. PARSONS.
MANUFACTURE OF WAGON SKEINS.
No. 379,026. Patented Mar. 6, 1888.
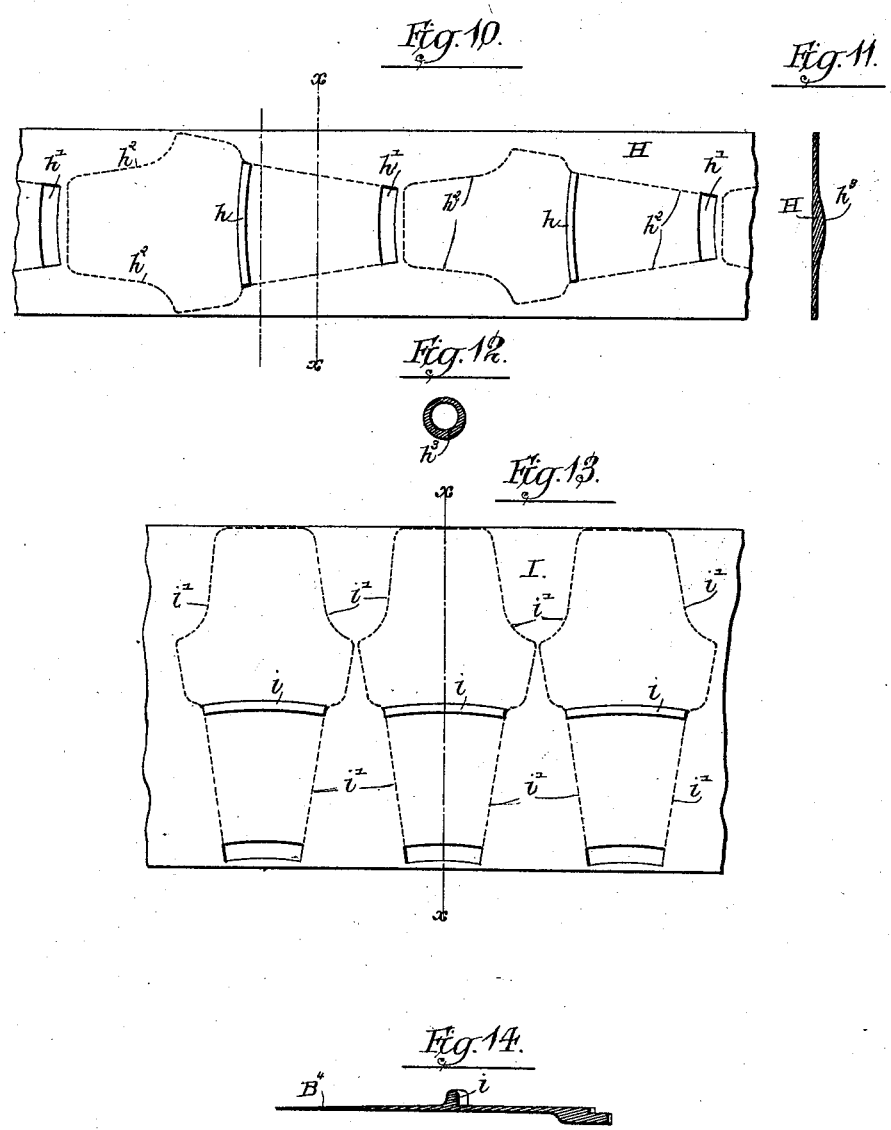

(No Model.) 4 Sheets—Sheet 4.

S. B. PARSONS.
MANUFACTURE OF WAGON SKEINS.

No. 379,026. Patented Mar. 6, 1888.

Witnesses:-
Louis M. Whitehead.
Wm. F. Henning.

Inventor:
Seneca B. Parsons.
by Dayton & Poole.
Attorneys.

UNITED STATES PATENT OFFICE.

SENECA B. PARSONS, OF CHICAGO, ILLINOIS.

MANUFACTURE OF WAGON-SKEINS.

SPECIFICATION forming part of Letters Patent No. 379,026, dated March 6, 1888.

Application filed November 11, 1887. Serial No. 254,895. (No model.)

*To all whom it may concern:*

Be it known that I, SENECA B. PARSONS, of Chicago, in the county of Cook and State of Illinois, have invented certain new and useful Improvements in Wagon-Skeins and Process of Making the Same; and I do hereby declare that the following is a full, clear, and exact description thereof, reference being had to the accompanying drawings, and to the letters of reference marked thereon, which form a part of this specification.

This invention relates to an improved axle-skein and process or method of making the same, having reference more particularly to the construction of the axle-collar on the skein and the plug or screw-threaded extension at the end of the skein upon which is placed the nut for holding the wheel upon the spindle.

In the manufacture of axle-skeins as heretofore practiced the axle-collar has in most instances been made separate from the skein and secured thereto by shrinking it upon the skein, or by other means of fastening. It has also been proposed in one instance to form the collar by swaging a flat metal blank in such manner as to form a projecting ridge upon one side of the same and a groove on the opposite or inner side of the blank. This method of forming the collar has been found very objectionable, for the reason that the metal is greatly weakened by being sharply bent, thereby greatly decreasing the strength and durability of the skein.

In constructing an axle-skein according to my invention I forge or swage the metal which is to form the skein to a flat blank having upon it an integral ridge, flange, or fin adapted to form the axle-collar when the flat blank is bent into tubular shape and welded. A blank having such integral fin may be made in any one of a number of well-known ways—as, for instance, the metal to form the blank may be swaged to a thin sheet, with a rib or fin thereon, by means of a drop-hammer or by the employment of groove-forming rolls, or rolls having forming recesses or matrices in their surfaces, as will hereinafter more fully appear.

As it relates to a novel method of forming the plug or cylindric projection at the outer end of the skein, the invention consists of forging, swaging, or rolling a blank with a thickened offset part or flange at its margin, which forms the end of the tubular skein, whereby the said projection is made integral with the skein, instead of being made of a separate piece or plug secured thereto, as heretofore common.

An axle-skein forming the products of the novel processes above described is made the subject of claims herein.

Figure 16:
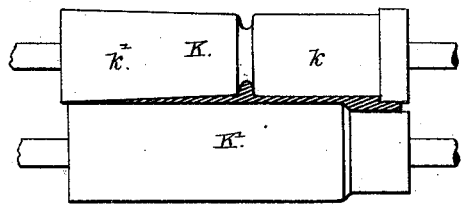
Figure 17:
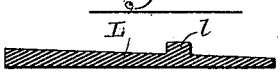

In the accompanying drawings, illustrating my invention, Figure 1 is a perspective view of a finished axle-skein. Fig. 2 is a longitudinal or axial sectional view of the finished skein. Fig. 3 is a face view of a flat sheet-metal blank for forming the same as said blank appears when in readiness to be bent into tubular shape and welded to form the finished skein. Fig. 4 is a longitudinal section of said blank, taken upon line *x x* of Fig. 3. Fig. 5 is a side view of a pair of rolls adapted to be used for making a curved blank bar or strip from which a number of blanks like that shown in Fig. 3 may be cut. Fig. 6 is a face view of the blank-bar made by the rolls illustrated in Fig. 5, showing in dotted lines the form of blanks cut from said blank-strip. Figs. 7 and 8 show two pairs of rolls forming an integral rib upon a sheet-metal blank by first making a U-shaped bend in the blank and then closing the metal of the bend into a solid rib. Fig. 9 shows in sectional view a pair of rolls having a series of forming-recesses in their contact-surfaces. Fig. 10 is a face or plan view of the strip made with the rolls shown in Fig. 9. Fig. 11 is a sectional view of the strip, taken upon line *x x* of Fig. 10. Fig. 12 is a cross-sectional view of the spindle part of a skein made from the blank shown in Figs. 10 and 11. Fig. 13 is a plan view of a straight blank-bar made by a pair of rolls similar to those shown in Fig. 9, wherein the blanks are cut transversely from the blank-strip. Fig. 14 is a sectional view taken upon line *x x* of Fig. 13. Fig. 15 is a view of a blank-bar like that illustrated in Fig. 14, showing a somewhat different arrangement of the projections or ribs thereon. Fig. 16 shows rolls for making a curved blank-bar from a metal strip orginally thicker at one side than the other. Fig. 17 is a sectional view of the bar before it is passed through the rolls shown in Fig. 15.

As shown in the said drawings, Figs. 1 and 2, A indicates the skein as a whole; A', the spindle portion thereof; A², the axle-collar; A³, the enlarged tubular part of the skein adjacent to the collar which fits over the end of the axle, and A⁴ the wing or prolongation of the part A³, which extends beneath the axle.

$a$ is the cylindric extension at the end of the spindle, which is screw-threaded to receive the nut for holding the wheel upon the spindle. As more clearly shown in Fig. 2, the axle-collar A² is made solid and integral with or of the same piece of metal as the body of the skein, and the part $a$ is similarly made integral with or a continuation of the metal forming the end of the spindle.

B, Figs. 3 and 4, is a flat metal blank from which the skein made as shown in Figs. 1 and 2 is constructed. Said blank consists, generally, of a flat piece of metal narrower at one end than at the other and provided with a main part or body, B', to form the spindle A' of the skein, a wider part, B³, to form the enlarged portion A³ of the spindle, and a part, B⁴, which forms the extension A⁴ of the skein. The said blank is provided across its outer surface, or that which forms the exterior of the skein, with a curved flange or rib, B², which, when the blank is bent into tubular shape, forms the collar A². At its smaller or narrower end the blank is thickened and provided with a projecting part or lip, $b$, offset from the flat face of the blank and adapted to form the tubular cylindric extension $a$ at the end of the skein when the blank is bent into tubular shape.

One way of making the blank B in carrying out the process forming part of my invention is illustrated in Figs. 5 and 6. In said figures, C C' are a pair of rolls for making a curved blank bar or strip such as is illustrated in Fig. 6. Said rolls C and C' are conical, and are so shaped as to form a space between them having the cross-sectional shape desired for the blank B. The rolls are made conical for the purpose of giving proper curvature to the rib B², so that when the blank is bent into tubular form the rib will stand in a plane perpendicular to the central axis of the conical spindle. For giving the desired cross sectional shape to the blank-strip the roller C is herein shown as provided with a groove, $c$, having the shape of the flange B² of the blank, while at their smaller ends said rolls are provided, respectively, with an enlarged part, $c'$, and a reduced part, $c^2$, for giving shape to the lip $b$ at the smaller end of the blank.

D, Fig. 6, is the blank formed by the rolls shown in Fig. 5, said blank being provided with a continuous curved flange, $d$, at its side face and an offset or lip, $d'$, at its inner or concave margin.

$d^2 d^2$ are dotted lines indicating the form of blanks cut from said strip D. The cross-sectional form of the blank-strip D is shown in Fig. 5. Said blanks may be severed from the strip by means of a cutting punch and die, or otherwise, as desired.

In the employment of rolls such as are shown in Fig. 5 the blank-strip D will be made from a thick piece or bar of metal, or from a pile or fagot of pieces of metal, as either iron or steel, or a combination of metals, as iron and steel, the said bar, pile, or fagot being rolled down, if necessary or preferred, thereby giving it a rough form, generally resembling that of the finished blank, preparatory to passing it through the rolls C C'. The pile or bar may be given the rough shape approximating that of the finished blank-strip D either in piling the fagot, or in the case of a single bar, by preliminary rolling of the bar.

In Figs. 7 and 8 I have illustrated rolls for forming a blank-strip having a flange, $d$, such as is shown in Fig. 6, wherein such blank-strip may be made from a flat sheet of metal not greatly thicker at any point than the main part or body of the finished blank.

E E', Fig. 7, are a pair of opposing conical rolls, one of which, E, is provided with a groove, $e$, corresponding in position with but considerably larger than the flange or fin $d$ of the blank D. The roller E is provided with a narrow annular flange, $e'$, arranged opposite the groove $e$. When the flat sheet of metal is passed between said rollers, the part of the metal acted on by the groove and flange will be crimped or bent into U shape, as indicated in said Fig. 7. After the metal sheet has been passed through the rollers E E', it will then be passed through another pair of rollers, F F', substantially like the rollers C C', (shown in Fig. 5,) the roller F being provided with a groove, $f$, having the form of the finished axle-collar, while the roller F' is smooth in its part opposite the said groove $f$. The metal sheet will be passed through both pairs of rolls E E', F F' when at a welding heat, so that the U-shaped part formed by the rollers E E' will, in passing through the rollers F F', be forced or squeezed into a solid rib integral with the other parts of the blank-strip. The blank-strip made by the rollers E E', F F' (shown in Figs. 7 and 8) may obviously be cut into separate blanks in the same manner as described in connection with the blank D. (Shown in Fig. 6.)

Instead of making a blank-strip of curved form with a continuous rib, $d$, for forming the axle-collar, as illustrated in said Fig. 6, a blank-strip may be made by rolling having at suitable intervals transverse curved ribs or projections to form the ribs of the individual blanks. In Fig. 9 I have shown a pair of rolls adapted to form a blank-strip of the character last described, while in Figs. 10 and 11 I have shown in face view and in cross-section a strip made by such rolls.

G G', Fig. 9, indicate forming-rolls of the kind last above referred to. The said rolls G G' are provided with a series of opposing forming recesses or matrices, $g g'$, and projections $g^2 g^2$, adapted to give the desired shape to a blank-bar passed between the rolls. For this purpose the roll G contains transversely-arranged curved recesses $g g$, which form upon the outer face of the blank the ribs or flanges to constitute the axle-collar, said roll G being also shown as provided with projecting parts $g^2$ $g^2$, which operate, in conjunction with recesses or depressions $g^3$ of the roll G', to form the thickened offsets or lips at the smaller ends of the individual blanks. In Fig. 10, showing the blank-strip H formed by the rolls G G', $h$ are the transverse curved ribs, and $h'$ are transverse curved depressions upon one face of the blank-strip, which constitute the ribs $B^2$ and the offset $b$ of the finished blank B, such as is shown in Figs. 2 and 3.

$h^2$, Fig. 10, are dotted lines indicating the outlines of the individual blanks cut from the blank-strip therein shown.

I have illustrated in Figs. 9, 10, 11, and 12 a novel construction in forged blanks for axle-skeins, wherein the metal of the skein at the under side of the spindle is made thicker than at other parts, thereby affording an additional thickness of metal at this point to compensate for the wear upon the lower surface of the spindle. For this purpose the blank, as clearly shown in Fig. 11, is made thicker in its part extending along its central line from a point near or back of the axle-collar and the end of the spindle, as clearly shown at $h^3$, Fig. 11, so that when the blank is bent and curved into tubular form the metal will be thicker at the bottom or lower part of the spindle portion of the skein than at the sides and top thereof. This construction is clearly indicated in Fig. 12. The thickened part $h^3$ will preferably extend past the collar, so as to give additional strength to the skein in its part adjacent to the collar, where it is most likely to break. An axle-skein blank made thicker at its part which forms the under part of the spindle I consider to be novel, and a blank of this kind is herein broadly claimed.

A blank-strip from which a series of individual blanks may be cut may also be made with rollers having forming-recesses in their opposing surfaces when the blank-strip is so shaped by the forming-rollers that a series of blanks may be cut from the strip side by side instead of end to end, as is the case with the strip shown in Fig. 10. A construction of this kind is shown in Figs. 13 and 14, wherein I is a straight blank-strip provided with a series of curved ribs, $i$, extending longitudinally of the strip, the blanks being cut from the strip I along the dotted lines $i'$ in the manner clearly indicated in the drawings.

Fig. 14 is a sectional view of the blank illustrated in Fig. 13. This blank is similar in cross-sectional shape to that shown in Fig. 4, with the exception that the portion thereof forming the prolongation $B^4$ is tapered to a fine or thin edge. It will of course be understood in this connection that the parts of the blank may be made thicker or thinner or tapered, as may be found necessary or desirable, for giving strength to the finished skein and for the economy of metal therein.

In Fig. 15 is shown a blank made generally like that shown in Fig. 13. In this instance, however, the blank-strip J is provided with a series of curved ribs, $j$ $j$, the alternate ribs being curved in opposite directions and being so placed that the blanks are cut from the blank-strip with their larger and smaller ends arranged in alternation at the same side of the blank-strip. This manner of cutting the individual blanks from the strip J is clearly indicated by the dotted lines $j'$, Fig. 15.

It is entirely obvious that the method of cutting the blanks from the strip shown in Fig. 15 is much more economical of metal than that shown in Fig. 13.

The rolls shown in Fig. 5 for forming a curved blank-strip having a continuous curved rib at its side face are made conical, for the purpose of giving a curved form to the blank. It is not essential, however, for the formation of a curved blank-strip of the character shown in Fig. 6 that conical rolls should be used, inasmuch as cylindric or approximately cylindric rolls may be employed, provided that the rolls are so arranged as to flatten out or make thinner the metal at one side of the blank to an extent sufficient to lengthen or stretch out the thinner side of the blank-bar, and thereby give it a curved form. This result may be produced either by rolling a blank originally made wedge-shaped in cross-section to an even thickness throughout or by rolling to a tapered form in cross-section a blank originally of equal thickness throughout.

In Fig. 16 I have shown two rolls, K K', for rolling a curved blank from a straight bar of metal. One of the rolls, K', is cylindric, while the other roll, K, is cylindric in its part $k$, which forms the spindle portion of the blank, and conical in its part $k'$, which forms the inner or tapered part of the blank.

Fig. 17 illustrates a bar or strip, L, made thicker at one edge than at the other and gradually tapered from its thicker to its thinner edge, so that it will be compressed to some extent throughout its entire width. Said bar or strip L is shown as provided with a thickened part, $l$, along the line where the rib to form the axle-collar is located. The bar L will be passed through the rolls K K' with its thicker edge opposite the conical part $k'$ of the roll K, so that the said thicker part of the bar L will be rolled down to form the thinnest part of the blank-strip. Such rolling down of the thicker part of the tapered bar L will stretch or extend the thicker edge of the blank-bar, and thereby give the bar as a whole a curved form, which, by making the blank-bar originally of suitable thickness in its different parts, may be made to exactly conform to the curvature required for the rib or flange of the blank.

It will of course be understood that the same result above described may be produced from a blank of even thickness throughout, provided the reduction in thickness at the side of the blank-bar which is most compressed or flattened is sufficient to give the required curve to the blank bar.

It will of course be understood that the novel features of construction in the axle-collar and the process of forming the same may be employed either in connection with an integral cylindric projection, $a$, or in connection with a projection made by a separate plug, as heretofore common. It is obvious, furthermore, that the presence or absence of the enlarged part $A^3$ or inward prolongation $A^4$ of the skein does not in any way affect the novel process or article herein claimed, and said prolongation may or may not be present in a skein constructed by means of or in accordance with my invention.

I claim as my invention—

1. The process or method of forming tubular axle-skeins and collars for the same, which consists in first shaping from a pile or rough bar a flat blank having a solid integral flange thereon and then forming from said flat blank a tubular skein, substantially as described.

2. A blank for sheet-metal axle-skeins, provided with a curved solid integral rib or flange, substantially as described.

3. The process of forming axle-skeins, which consists in swaging or forging from a rough bar or pile a flat blank having a curved flange on its side face and an offset lip at its end, and then bending said blank to tubular form and welding its edges to form the skein, substantially as described.

4. The blank described, consisting of a flat plate provided with a curved rib or flange, $B^2$, and having a thickened offset lip, $b$, at its end margin, substantially as described.

5. The novel axle skein described, consisting of a tapered metal tube provided with an integral collar, $C^2$, substantially as described.

6. The novel axle-skein described, consisting of a tapered metal tube provided with an integral collar, $C^2$, and with an integral cylindric extension, $a$, at its end, substantially as described.

In testimony that I claim the foregoing as my invention I affix my signature in presence of two witnesses.

SENECA B. PARSONS.

Witnesses:
C. CLARENCE POOLE,
Q. N. WILLIS.